United States Patent
Evtuhov et al.

[11] 3,824,717
[45] July 23, 1974

[54] ENHANCED FIELD OF VIEW PARAMETRIC IMAGE CONVERTER

[75] Inventors: Viktor Evtuhov; Bernard H. Soffer, both of Pacific Palisades; David Y. Tseng, Thousand Oaks, all of Calif.

[73] Assignee: Hughes Aircraft Company, Culver City, Calif.

[22] Filed: July 30, 1973

[21] Appl. No.: 383,935

[52] U.S. Cl. ................................ 307/88.3, 250/330
[51] Int. Cl. ............................................. H03f 7/00
[58] Field of Search ..................... 307/88.3; 250/330

[56] References Cited
UNITED STATES PATENTS
3,629,602 12/1971 Firester ............................. 307/88.3

*Primary Examiner*—Herman Karl Saalbach
*Assistant Examiner*—Darwin R. Hostetter
*Attorney, Agent, or Firm*—W. H. MacAllister, Jr.; D. C. Keaveney

[57] ABSTRACT

There is disclosed an optical frequency up-conversion system which uses a pair of dichroic mirrors positioned on the optical axis of an infrared collector to produce a multipass traverse of a nonlinear crystal positioned between the mirrors by a beam of pumping radiation in order to enhance the field of view, the conversion efficiency and the resolution of the system. The crystal is placed in the optical path at the interaction area of the infrared beam and the pump beam and between the dichroic mirrors. One of the mirrors is transparent to the infrared frequency and the other is transparent to the up-converter sum frequency. Both mirrors are reflective at the pump frequency. The system may be passive and collect a thermal image or it may utilize a pulsed ir illuminator laser in conjunction with a synchronously pulsed pump laser in order to increase the output power level.

13 Claims, 7 Drawing Figures

PATENTED JUL 23 1974

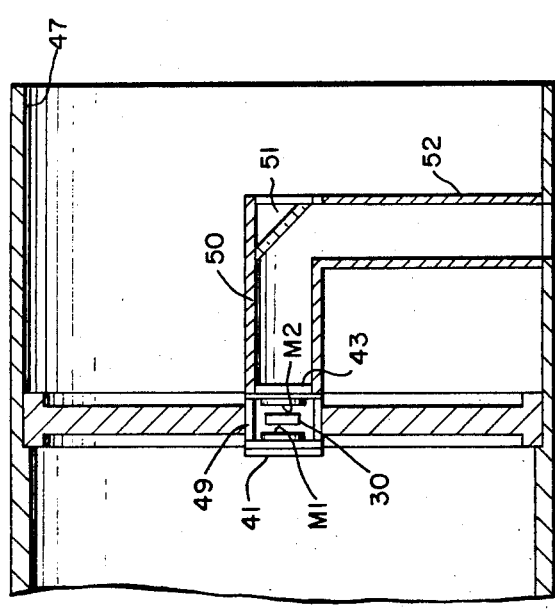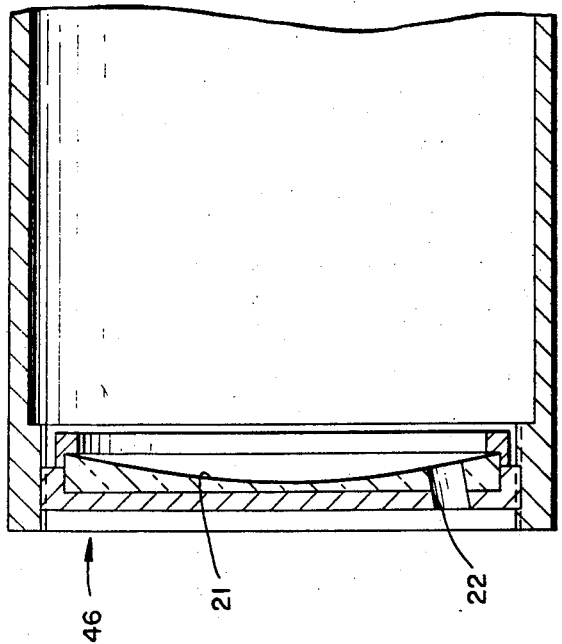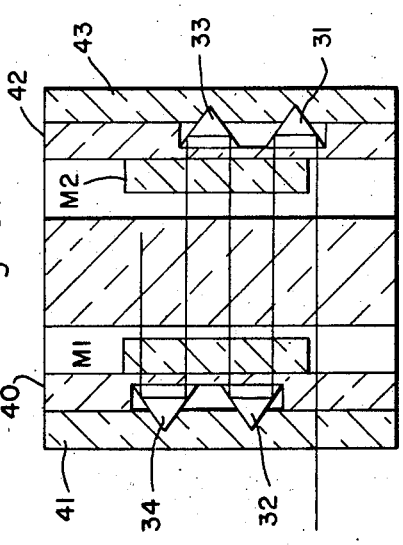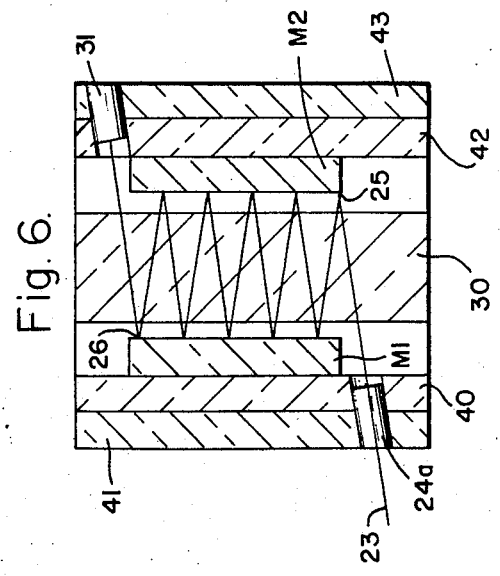

ENHANCED FIELD OF VIEW PARAMETRIC IMAGE CONVERTER

BACKGROUND OF THE INVENTION

1. Field of the Invention

Recently a new method of detecting infrared images has been discovered which involves the use of a nonlinear process called optical parametric up-conversion and offers the possibility of avoiding such problems as mechanical scanning and cryogenic cooling of the detectors which are encountered in presently employed infrared systems. In the parametric process, the infrared radiation is up-converted into the visible (or near visible) region where direct viewing by the unaided eye (or detection by sensitive visible image tubes) is possible. The parametric image up-conversion process is in some ways analogous to an electrical heterodyning process in that the output includes the sum or difference of two input frequencies and is carried out in an appropriate nonlinear material by mixing the infrared image radiation with a suitable shorter wavelength laser output, commonly referred to as a pump source. Both active, (ir illumination) and passive (ir thermal detection) modes of operation are possible using the up-conversion process.

2. Prior Art

For a discussion of nonlinear optics generally, reference is made to section 5.12 of a book entitled "Introduction to Modern Optics" by Grant R. Fowles, published in 1968, by Holt, Reinhart and Winston, Inc., and to chapters 21 and 22 of a book by Amnon Yariv entitled "Quantum Electronics" published in 1967 by John Wiley & Sons.

In up-conversion systems contemplated at the present time, a limitation exists in the attainable field of view of the complete system which includes the up-conversion device and the telescope optics. The limitation is imposed by an interplay of a number of factors including the requirement for high conversion efficiency of the optical system, the basic limitation on the up-conversion phase matched acceptance angle, and the requirement for high pump power densities to achieve high conversion efficiencies which, with the pump sources available at the present time, implies a small pumped area. It can be shown that for an optimized system with pumped area of a few milimeters in cross-section, optical systems with fields of view above a milliradians or so are difficult to design. For example, for a system with a 2.0 millimeter diameter pumped area, conversion efficiency of $10^{-3}\%$ (with a C. W. Ruby laser as pump source) collecting optics aperture of 50 centimeters, and with 576 resolution elements, a field of view of only 0.6 milliradians is attainable. Existing schemes designed to increase the field of view utilize a mechanical rotation of the nonlinear crystal through an angle determined by the desired increase in the up-conversion acceptance angle. Such schemes have been discussed by R. A. Andrews in an article in the "Journal of Quantum Electronics": (IEEE) QE-5, 548 (1969). In addition to the limitations on the field of view increase thus attainable, these schemes also reduce the time response of the system.

SUMMARY OF THE INVENTION

The present invention relates to a system which can achieve an increase in the field of view and the number of resolution elements without the limitations noted above inherent in existing schemes. The present system utilizes a matrix comprising a plurality of optical mixing crystals or a single large crystal within an optical system including mirrors arranged to generate multiple passes through the nonlinear crystals. In one embodiment a mosaic of non-linear crystals is used and two dichroic mirrors are arranged in such a way as to make the beam from a single CW laser pump successively traverse the whole array of crystals. Other mirrors or prisms are employed to shift the pump beam from one column of the crystals to the next. The infrared image beam is, of course, also applied to the crystal mosaic to produce the optical conversion action. Since the focussing requirements on the pump beam are not very stringent (2.0 millimeter diameter at the focus is adequate) the beam can be used to traverse a large number of crystals before spreading significantly. For example, using the 2.0 millimeter diameter at the beam minimum, it is found that the characteristic Rayleigh length is $$b = 2\pi w^2 \min/\lambda = 9.2 \text{ meters} \tag{1}$$

Also, because of the relatively low conversion efficiency (typically 0.01%) on each pass of the beam through the non-linear crystal, many passes are possible before significant pump beam depletion occurs. In fact, in practice the maximum number of passes will be determined by the dichroic mirror reflectivites rather than the pump beam depletions. Because the number of passes is limited there is a trade off between the conversion efficiency determined by the pump beam size and the overall field of view as determined by the total number of pump beam passes allowed. In one modification suitable for a system using active illumination, the pump beam power and conversion efficiency peak value can be increased by using a pump beam pulsed synchronously with an ir illuminating beam.

The mirrors in front and in back of the crystal mosaic through which the multiple passes are made must have special transmission and reflection characteristics. One must be transmitting at the incoming infrared wavelength, $\lambda_{ir}$, and highly reflecting at the pump wavelength, $\lambda_p$; the other must be transmitting at the up-converted frequency, $\lambda_s$, and reflecting at $\lambda_p$. Such characteristics can be obtained with multilayer dielectric coatings.

BRIEF DESCRIPTION OF THE DRAWINGS

The features and advantages of the invention will be more apparent from the detailed description set forth below in connection with the accompanying drawings in which like reference characters refer to like parts throughout and wherein:

FIG. 4 is a sectional view through an illustrative physical embodiment of the device of the present invention;

FIG. 5 is a top view of the assembled multipass nonlinear crystal unit shown in FIG. 4;

FIG. 6 is a side view of the unit of FIG. 5; and,
FIG. 7 is a diagramatic schematic view of an alternative embodiment of the invention.

PREFERRED EMBODIMENTS

Figure 1:
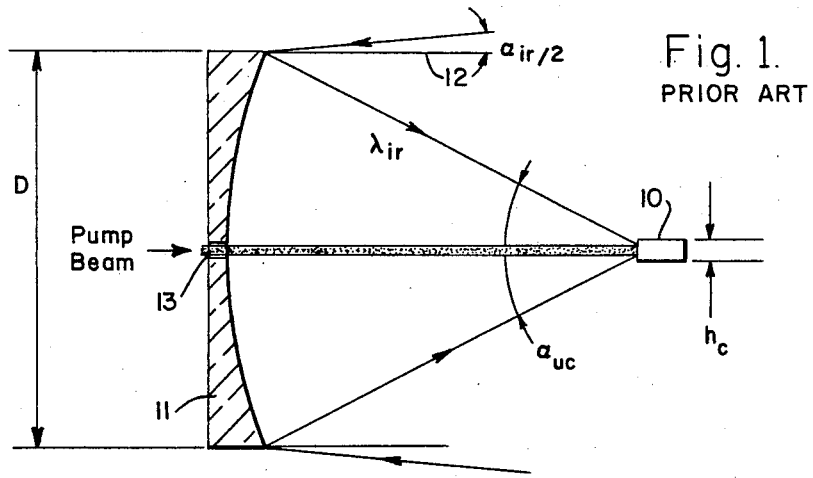
FIG. 1 is a diagramatic illustration of a prior art form of parametric up-converter.

Turning now to the drawing, there is diagramatically illustrated in FIG. 1 a conventional or prior art upconversion system in which the nonlinear crystal 10 is used as a component of an infrared viewing system which employs a single pass pumping scheme and is thus severely limited in its field of view. The system contemplates an objective lens or telescope which includes a spherical surface reflector 11 for focusing the received infrared beam 12 onto nonlinear crystal 10 and which has a central aperture 13 through which a pump beam is transmitted also to the crystal 10.

Because of the interdependence of the upconversion parameters when applied to consideration of such a system, no one parameter can be independently adjusted or optimized without compromising other aspects of the infrared imaging system. For the problem under consideration, the field of view of an infrared image up-converter, as shown in FIG. 1 can be increased only at the sacrifice of conversion efficiency or system resolution.

Figure 2:
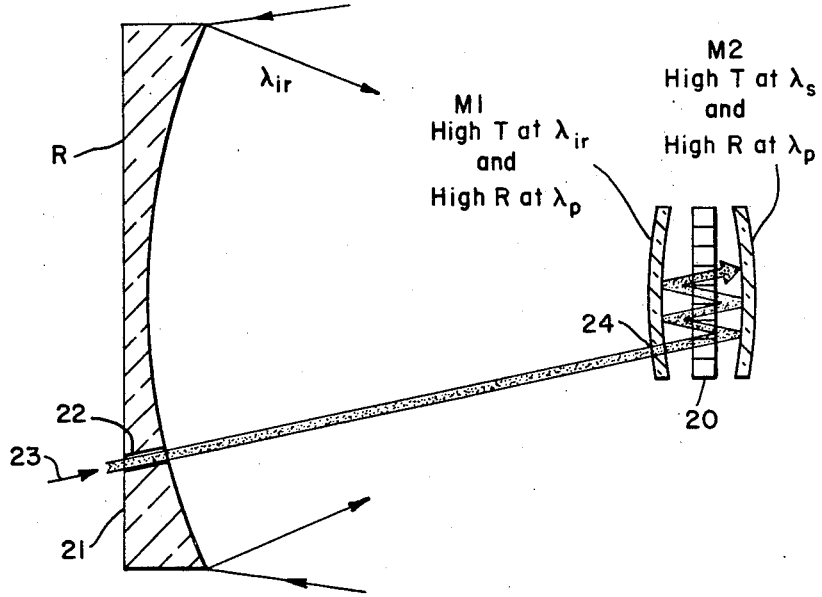
FIG. 2 is a similar diagramatic illustration of the parametric up-converter of the present invention.

The present invention as diagramatically illustrated in FIG. 2 teaches a multipass matrix pumping scheme by which the system field of view can be increased without sacrificing the conversion efficiency or system resolution of the infrared image up-conversion system. The embodiment shown in FIG. 7 using synchronous detection of a pulse lluminated scene rather than passive detection or CW illumination even further increases peak conversion efficiency again at no sacrifice of system resolution.

The intrinsic external acceptance angle ($\alpha_{uc}$) of typical prior art infrared up-converters is limited to several degrees governed by phase match requirements. For example, a ruby laser pumped KDP up-converter crystal for 1.06 micron infrared radiation yields an $\alpha_{uc}$ of 2.5°; and a ruby laser pumped proustite ($Ag_3AsS_3$) upconverter crystal for 10.6 micron infrared radiation yields a calculated $\alpha_{uc}$ of 5.7° at the full width half maximum points. To increase this angle, a non-collinear phase match scheme has previously been proposed. Reference is made, for example, to an article by J. Warner in the February, 1969, issue of the magazine "Opto Electronics" at page 25 entitled "Phase Matching For Optical Up-Conversion With Maximum Angular Aperture-Theory and Practice." With this mode of operation, the $\alpha_{uc}$ of the above examples can be increased to 3.6° and 8.5° respectively. Still further increases can be effected with this scheme by increasing the pump beam divergence, but only at the expense of conversion efficiency and resolution. A mechanically scanned ir image up-converter system has been demonstrated and described by R. A. Andrews in an article entitled "Wide Angular Aperture Image Up-Conversion" in the IEEE Journal of Quantum Electronics, Vol. 5, page 548 in the issue of November, 1969. This system increased the resultant crystal $\alpha_{uc}$ to 20°. However, the necessity of a mechanical scanning may not be suitable for many applications, especially in fast response electronically processed imaging systems. Although an $\alpha_{uc}$ of several degrees is obtainable for the up-converter crystal, the system field of view of the ir image up-conversion system is necessarily diminished in order to achieve high efficiency and high resolution operation. For example, if the ruby laser pumped proustite crystal (with $\alpha_{uc} = 8.5°$) is used in the configuration of FIG. 1, with $D = 50$ centimeter, $h_c = 0.2$ centimeter and $\lambda_{ir} = 10.6$ micron, a system field of view of only 0.6 milliradians results. Here, $D$ is the diameter of the $ir$ collector; $h_c$ is the diameter of the $ir$ - pump interaction area, and $\lambda_{ir}$ is the wavelength of the incoming infrared radiation.

In the foregoing case there are only 24 linear resolution elements based on the approximation that the number of resolution elements, $N_R$ is approximately equal to the square of the ratio of $\alpha_{ir}$ to $\theta_r$ where $\alpha_{ir}$ is the ir imaging system field of view and $\theta_r$ is the diffraction limited resolution angle. The multipass matrix pumping system of the present invention avoids the foregoing problems associated with mechanical scanning systems and increases the system field of view while preserving the up-conversion efficiency and resolution.

The prior art configuration of FIG. 1 is relevant to illustrate operating principles inherent in up-conversion. The nonlinear crystal 10 is placed at the image of the distant ir object in order to produce a minimum interaction area (for maximum efficiency) consistent with the up-conversion acceptance angle, $\alpha_{uc}$. By imposing the conservation of brightness, and assuming an ideal ir collector, 11, $$\Omega_{uc}S_{uc} = \Omega_{ir}S_{coll},$$

(1)

where $\Omega_{uc}$ is the intrinsic up-conversion external acceptance solid angle, $S_{uc}$ is the interaction area, $\Omega_{ir}$ is the solid angle of the ir imaging system field-of-view, and $S_{coll}$ is the area of the ir collector. $S_{coll}$ is chosen to be equal to the area subtended by $\Omega_{uc}$, i.e., the f-number of the system is fixed at $1/\alpha_{uc}$. For $\alpha_{ir}$, $\alpha_{uc}$ as large as 90°, Eq. (1) can be reduced to $$\alpha_{ir}D = \alpha_{uc}h_c,$$

(2)

with negligible error. In Eq. (2), $D$ and $h_c$ are the diameters of $S_{coll}$ and $S_{uc}$, respectively, and $\alpha_{ir}$ is the ir imaging system field-of-view. The angle $\alpha_{ir}/2$ is shown at 12.

Combined with the diffraction limited resolution angle $\theta_r \approx \lambda/D$, the system field-of-view becomes $$\alpha_{ir} = h_c\alpha_{uc}\theta_r/\lambda_{ir}$$

(3)

For up-conversion, the image height $h_c$ can be associated with the diameter of the pump beam. Thus, as pointed out above, the introduction of the ir up-conversion crystal as an integral part of an ir viewing system immediately imposes certain constraints among the various up-conversion parameters. In the example under consideration, the system field-of-view, $\alpha_{ir}$, is thus dependent on: the pump beam diameter, $h_c$, the intrinsic up-conversion acceptance angle, $\alpha_{uc}$; the diffraction limited resolution angle $\theta_r$ of the ir collector mirror; and the ir wavelength $\lambda_{ir}$. Considering $\lambda_{ir}$ and $\alpha_{uc}$ as fixed for a given wavelength, nonlinear crystal, and pump laser of interest, it is seen that increased field-of-view can be achieved by increasing $h_c$ or $\theta_r$.

The former reduces the conversion efficiency of the up-converter (since the pump lasers are output power limited), and the latter decreases the resolution of the system.

The multipass matrix pumping system of FIG. 2 can be utilized to overcome these restrictions. In this system a large field-of-view can be obtained by increasing $h_c$ or $\theta_r$ without sacrificing conversion efficiency or resolution, whereas to obtain a larger field-of-view with given resolution, in single pass systems too large an $h_c$ is needed for efficient single pass up-conversion. The system of FIG. 2 allows the entire ir image to be up-converted at high conversion efficiency.

The system includes an ir collector 21 having, for example, an aperture 22 or other means for providing pump beam 23 off of and at an angle to the axis of symmetry of collector 21 in order to produce multipass traverse of an up-converter crystal 20 by beam 23. Crystal 20 is positioned orthogonally to the axis of symmetry of the collector and between first and second dichroic mirrors $M_1$ and $M_2$ at the intersection of the pump beam with the optical path. Crystal 20 may be a single crystal or a mosaic of nonlinear crystals. In FIG. 2 $\lambda_{ir}$ is the infrared wavelength, $\lambda_p$ is the pump wavelength, and $\lambda_s$ is the up-converted image wavelength which is the sum or difference of $\lambda_{ir}$ and $\lambda_p$. In a preferred example where $\lambda_{ir} = 10.6\mu$ and $\lambda_p = 0.6943\mu$, mirror coatings separating $\lambda_p$ and $\lambda_s = 0.6515\mu$ are commercially available from O.C.L.I., Inc. of Santa Rosa, Calif. As noted in FIG. 2 both $M_1$ and $M_2$ are highly reflective at $\lambda_p$ so that an entrance port 24 is provided in $M_1$ to admit pump 23 for multiple reflection between the inner surfaces of $M_1$ and $M_2$. $M_1$ is highly transmissive at $\lambda_{ir}$ and $M_2$ is highly transmissive at $\lambda_s$ so that an ir radiation reflected from collector 21 will be directed onto crystal 20 and the $\lambda_s$ radiation produced by crystal 20 will be transmitted through $M_2$.

Crystal 20 may be located at the focal plane of collector 21 if it is desired to directly form an image at the crystal. Alternatively, crystal 20 may be positioned elsewhere in the optical path in order to accommodate Fourier transform system design criteria or to serve any other desired purpose. Furthermore, the mirror $M_1$ and $M_2$ may be portions of spherical surfaces in order to themselves produce both vertical and horizontal pump beam translation during traverse, or they may be plane mirrors with auxiliary reflector means such as prisms provided for this purpose as shown in detail in FIG. 3.

In any variation, the small diameter pump beam 23 is reflected between the two appropriately coated and contoured mirrors, $M_1$ and $M_2$, to produce a matrix array of multiple beam passes through the nonlinear crystal. Each pass of the pump beam through the nonlinear crystal up-converts a portion of the ir image with the conversion efficiency of the high power density of the pump beam used. Because there is insignificant depletion of the pump beam at each pass, even at high ir conversion efficiencies, it is possible to up-convert the entire ir image at high efficiency. Assuming no other losses, the confocal parameter (or Rayleigh distance) of the pump beam determines the maximum number of significant passes for a given crystal length. Typically, this distance is large compared to available crystal lengths, e.g., a ruby laser pumped proustite up-converter which utilizes an $h_c = 0.2$ cm has a confocal parameter of 9.2 m. In practice, mirror losses limit the maximum number of passes. In a similar fashion, to obtain greater resolution for a given field-of-view (which requires a decrease in $\theta_r$ and a concomitant increase in $h_c$), the same multipass scheme can be employed. This can be seen from Eq. (3) and recalling that the angle subtended by the ir collector at the image is constrained to be $\alpha_{uc}$. The exact number of pump beam traverses in the multipass scheme depends on the specifications for up-conversion efficiency and the number of resolution elements required. Converting the previous single-pass example to a multipass scheme employing a 7 × 7 matrix pumping array, while maintaining a pump diameter of $h_c = 0.2$ cm for each pass (i.e., the effective $h_c$ now becomes 7 × 0.2 cm), the system field-of-view and resolution can be increased to $\alpha_{ir} = 4.2$ mrad and $N_R = (168)^2$ resolution elements, respectively. The high conversion efficiency of the single-pass system is maintained for a significant portion of the pumping matrix, and decreases by only 3 dB for the final passes if a reflectivity of 99.5% at $\lambda_p$ is assumed for the multipass mirrors.

For applications where the ir image size $h_c$ may exceed the available nonlinear crystal diameter, the same multipass matrix method may be utilized by merely replacing the single crystal by a mosaic of nonlinear crystals. Thus, the multipass matrix pumping system of FIG. 2 can overcome field-of-view or resolution limitations imposed by single pass ir image up-converters even for relatively large images.

FIGS. 3, 4, 5 and 6 illustrate the opto-mechanical details of one preferred embodiment of a multipass system, the principles of operation of which have been discussed in connection with FIG. 2 for the case where a single crystal 20 is used and the multipass path comprises a single vertical sweep up the crystal by multiple reflection back and forth between the inner surfaces of mirrors $M_1$ and $M_2$.

Figure 3:
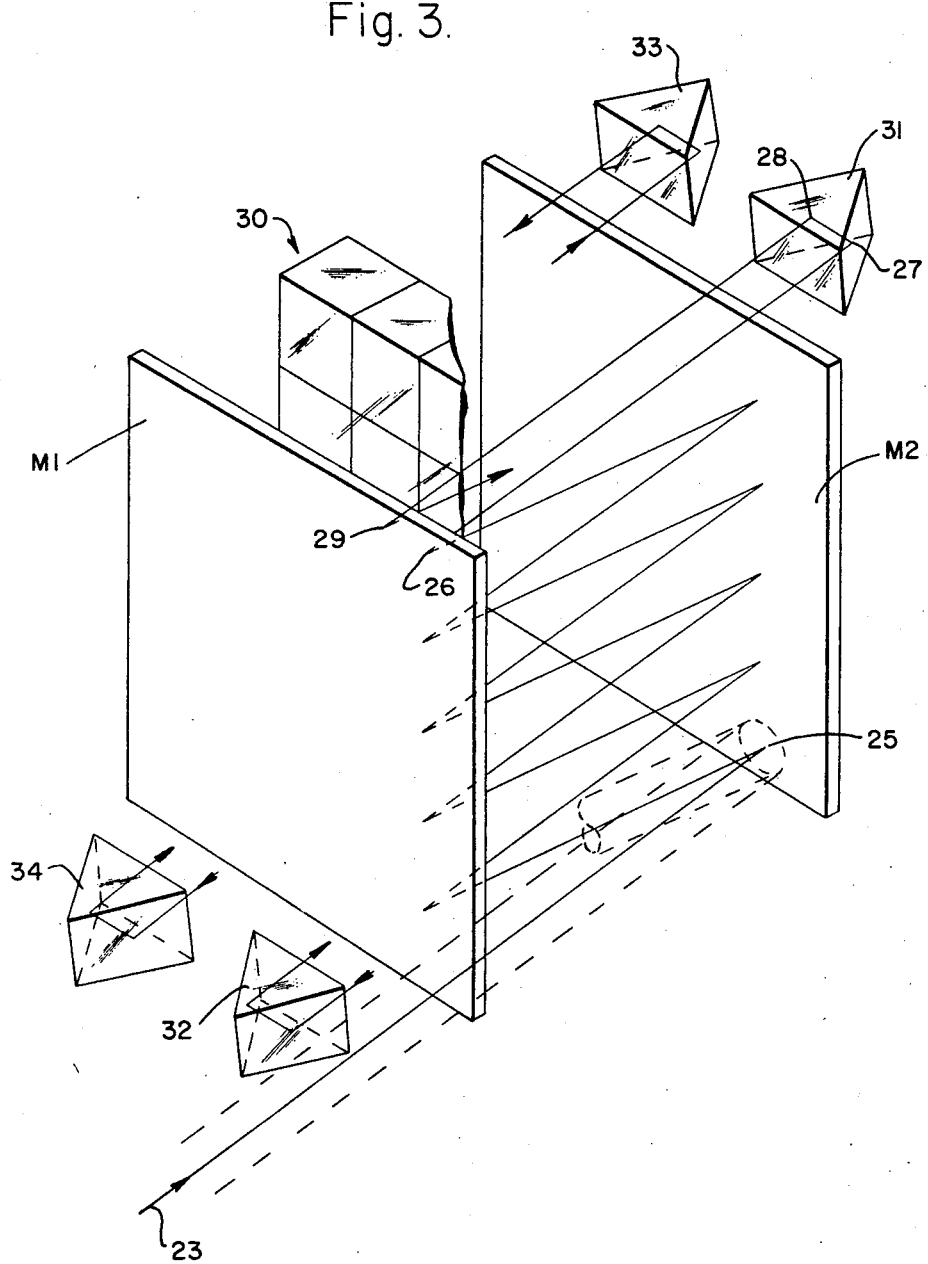
FIG. 3 is an enlarged exploded perspective view pictorially illustrating the optical relationships in the multipass arrangement of the nonlinear crystal mosiac.

In FIG. 3 the more general case where a crystal matrix 30 is used for the crystal is illustrated. It will be noted that in this instance the pump beam 23 passes beneath the lower edge of mirror $M_1$ rather than through an aperture in it and first impinges on the mirror $M_2$ at the point 25. The pump beam is then reflected back and forth between the inner surfaces of mirrors $M_2$ and $M_1$ upwardly until it finally reaches the point 26 on the upper portion of mirror $M_1$. Of course it will be understood that the crystal matrix 30 is shown broken away and that in fact the crystal matrix extends throughout the volume between the mirrors $M_1$ and $M_2$ so that the multiple reflections of the pump beam between points 25 and 26 actually traverse a vertical row of crystal elements in the matrix 30. From the point 26 the pump beam is reflected to a prism 31 which is mounted above the mirror $M_2$ in order to displace the pump beam horizontally across the mirror surface by the width of one row of crystal in crystal matrix 30. Thus, from point 26 the beam impinges on point 27 inside prism 31 from which is reflected to point 28 of the other inner surface thereof and thence back outwardly to point 29 on the inner surface of mirror $M_1$. It will be noted that the path from point 26 through 27, 28 and back to 29 displaces the pump beam by the width of one row of crystals in the crystal matrix 30. The beam is now multiply reflected down a row of crystals and thence is brought out to prism 32 which is positioned beneath the mirror $M_1$ in a manner described below. The prism 32 again serves to displace the pump beam horizontally by the width of one crystal and the beam is again multiply reflected between the mirrors $M_1$ and $M_2$ up to another prism 33. The prism 33 displaces the pump beam again by the width of one row of crystals and starts the multipass reflection process over again. At the end of this multipass the beam impinges on prism 34 which displaces the beam again by a single crystal width and starts the final multipass traverse up the crystal matrix. At the end of this traverse the pump beam is simply dissipated out into the system.

Of course it will be understood that FIG. 3 is an exploded perspective view partly broken away in order to clearly illustrate the optical path. FIGS. 4, 5 and 6 illustrate the mechanical assembly details of the system. FIG. 5 is a top view looking down on the arrangement shown in FIG. 3 whereas FIG. 6 is a side view looking inwardly between the mirrors. It will be noted that the mirror $M_1$ is mounted on a support member 40 which is integral with a backing member 41 and that the mirror $M_2$ is mounted on a support member 42 which is integral with a backing member 43. The backing and support members extend beyond the edges of the mirrors and are shaped and recessed to provide appropriate mountings for the prisms 31, 32, 33 and 34. In this illustrative embodiment four prisms are shown which will accomodate five rows of non-linear crystals. In general, any convenient number of prisms may be used resulting in one more row of crystals than there are prisms.

As may be seen in FIG. 4, the entire assembly of the mirrors $M_1$ and $M_2$, their associated prisms and the support and backing members therefore are positioned by a suitable spider support member 45 on the optic axis of an infrared telescope 46. The infrared reflector 21 receives energy from the objective end 47 of the telescope and reflects it to form an image at the position of the crystal 30 between mirrors $M_1$ and $M_2$ in direct imaging systems. The pump beam 23 is admitted through an aperture 22 extending through the reflector 21 and the mounting therefore as well as the telescope casing, or by any other convenient equivalent arrangement. It also is to be understood that the mounting members 40 and 41 are transparent to the infrared wavelength whereas the mounting members 42 and 43 are transparent to the up-converted sum wavelength.

The mirrors $M_1$ and $M_2$ and their support and backing members are enclosed in a housing 49 which has a continuation thereof at 50 extending axially along the length of telescope 46 to a reflector 51 such as a corner prism or a 45° mirror which deflects the rays forming the up-converted image out of the telescope structure. The prism or mirror serves as a reflector and the reflector is positioned so as to fold the optical path to direct the rays along housing 52 and out a port 53 in the side of the housing of telescope 46 for convenient viewing. Of course it will be understood that the mechanical arrangement illustrated in FIGS. 3, 4, 5 and 6 is merely illustrative of one preferred embodiment and that many variations thereon are quite possible.

Figure 7:
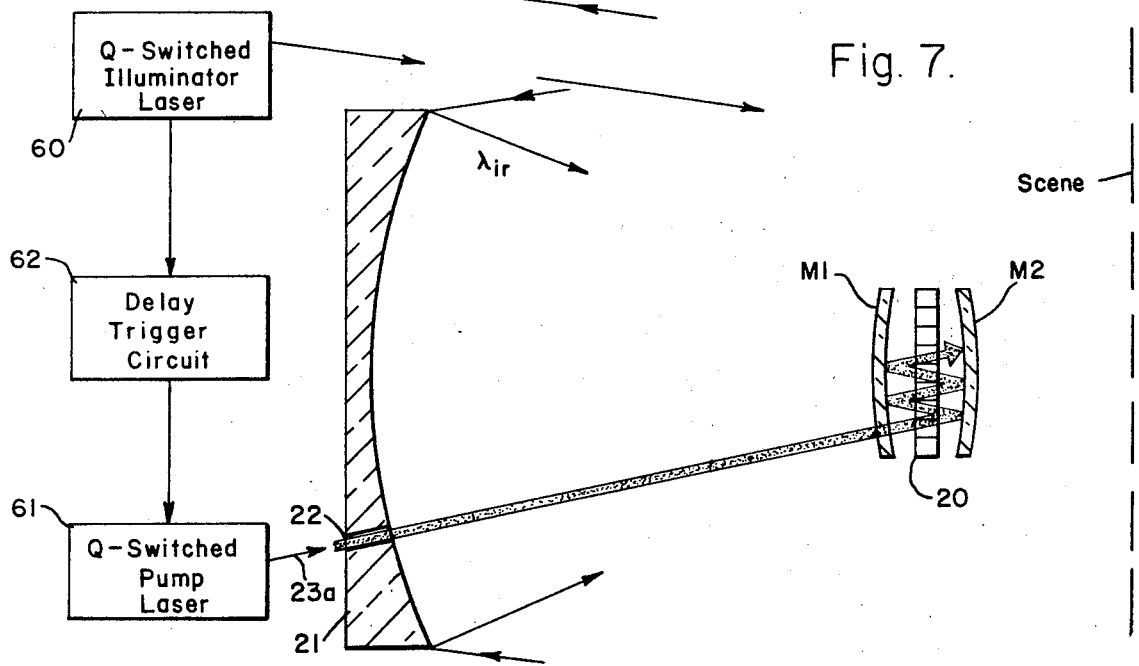

The above discussion of the system shown in FIGS. 2 through 6 assumes that the pump beam 23 is derived from a continuous wave laser and that the telescope 46 is a passive system receiving thermal radiation emitted by an object being viewed. Such a system places a severe limit on the amount of infrared radiation available from thermal images. Even a continuous wave infrared laser illuminater used with such a system is limited in practice by the usable power determined by the damage threshold of the non-linear up-converter crystal to the pump laser radiation at the wavelength used. These damage threshold are generally much lower than those for pulsed pump lasers.

Where it is desired to achieve high conversion efficiency and to generate high power at the up-converted wavelength, while retaining the optical advantages of the system of FIGS. 2 – 6, it is preferred to use a system of the type illustrated in FIG. 7 wherein a pulsed infrared illuminator 60 supplies infrared radiation to a scene to be observed which is reflected therefrom to the reflector 21 and wherein a synchronously pulsed laser 61 provides the pulsed pump beam 23a to provide the up-conversion. The Q switched illuminator laser 60 is connected through a delay trigger circuit 62 to trigger the Q switched pump laser 61 at a time such that the pump beam will reach the crystal 20 at the same time the reflected illuminator beam reaches it. The delay time of the circuit 62 is, of course, adjustable manually or automatically as by a laser range finder to assure proper synchronization. In this or other systems the output from the viewing port 53 of telescope 47 may, if desired, be supplied to an image intensifier tube.

In one preferred arrangement the illuminator 60 was a 10.6 micron infrared radiation Q switched carbon dioxide laser whereas the crystal 20 was a proustite non-linear crystal. A triggering pulse was picked up from the rotating mirror Q switch of the laser 60 and sent through the adjustable time delay trigger circuit 62, the output of which was used in turn to trigger the acousto-optic switch of the Nd:YAG pump laser 61. The delay is experimentally adjusted in order to bring the pump laser into synchronism with the infrared pulses in the mixing crystal 20. The 1.06 micron pump laser output and the 10.6 micron illuminator laser output were both polarized as ordinary waves. The up-converted 0.964 micron signal was detected with a calibrated S-1 image intensifier surface photo-multiplier (RCA 7102) after passing through an appropriate number of filters to block the pump beam. The output of the photomultiplier was exhibited on a Tektronix Model 555 oscilloscope triggered by reference pulses of the 10.6 micron radiation which were beam split from the output of the $CO_2$ laser. The 10.6 micron pulses from the illuminator laser were up-converted by the 1.06 micron pulses from the pump laser to provide up-converted imagery at 0.964 micron with good conversion efficiency and high power output. Since frequency, $f$, equals the reciprocal of wavelength ($1/\lambda$), these numerical values result from the equation:

$$1/\lambda_p + 1/\lambda_{ir} = 1/\lambda_s \qquad (4)$$

or here, $$1/10.6 + 1/1.06 = 1/0.964 \qquad (5)$$

Such a system has been operated at a repetition rate of 133 pulses per second. Under these conditions, the beam of the up-converted signal is easily imaged and clearly visible on an ordinary S-1 surface image intensifier tube. Thus, high speed electronic "imaging" of infrared illuminated scenery is possible wherein the pulses of the up-converted image information are electronically processed at a high data rate. Similarly, real time viewing of infrared illuminated objects is possible at a conventional frame rate.

What is claimed is:

1. Apparatus for up-converting the frequency of electromagnetic radiation comprising:
   a. nonlinear up-converter crystal means;
   b. collector means to collect radiation at a first frequency and direct it onto said crystal means;
   c. means to direct a beam of pumping radiation at a second frequency onto said crystal; and,
   d. reflector means to multiply reflect said pumping beam through said crystal means so as to pass said beam therethrough more than once to interact with said first frequency radiation to produce radiation at a third frequency which is equal to the sum of said first and second frequencies.

2. Apparatus as in claim 1 wherein said reflector means comprises first and second dichroic mirrors positioned on opposite sides of said crystal means, a first of said mirrors being positioned to receive said beam of pumping radiation and to reflect it to said second mirror, said second mirror being positioned to reflect said beam back onto said first mirror for multiple repetition of said reflections, both of said mirrors having high reflectivity at said second frequency of said pump beam radiation to thereby produce a multipass traverse of said pump beam through said non-linear crystal means.

3. Apparatus as in claim 2 wherein said first frequency is in the infrared region of the spectrum and said third frequency is in the visible region of the spectrum, said second pump frequency being equal to the difference in frequency between said first and third frequencies, and wherein said first mirror has high reflectivity at said second frequency and high transmissivity at said first frequency and said second mirror has high transmissivity at said third frequency and high reflectivity at said second frequency.

4. Apparatus as in claim 2 wherein said non-linear crystal means comprises a matrix array of a plurality of rows and columns of individual nonlinear crystals and further including at least one reflector associated with said first mirror and at least another reflector associated with said second mirror, said one reflector being positioned to receive said multiply reflected beam after its traverse through one column of said matrix of linear crystals and to displace it in a row direction to the next column of linear crystals for reflection down said column, said other reflector being positioned to receive said pump beam after having been multiply reflected down said second column of said matrix of nonlinear crystals and to displace it for multiple reflection through the next column thereof.

5. Apparatus as in claim 1 wherein said pump beam is supplied from a continuous wave laser and is transmitted to said crystal in a beam directed at an angle to the axis of symmetry of said collector.

6. Apparatus as in claim 2 wherein said pump beam is supplied from a Q-switched pump laser and is transmitted through an aperture in said collector means positioned off of the axis of symmetry thereof, said Q-switched laser being triggered by a signal from a trigger delay circuit which in turn receives its input from a Q-switched illuminator laser the output of which illuminates the scene to be observed by repetitive pulses, said trigger delay circuit being adjusted in its time delay to synchronize the arrival of the output pulse from said Q-switched pump laser at said non-linear crystal with the arrival of scene reflected pulses from said illuminator laser.

7. Apparatus for up-converting the frequency of electromagnetic radiation comprising:
   a. nonlinear up-converter crystal means;
   b. collector means having an axis of symmetry and being positioned to collect radiation at an infrared frequency and to direct it onto said crystal means;
   c. means to direct a beam of radiation at a pump frequency to interact with said infrared beam at said nonlinear crystal means, the numerical sum of the frequency of said infrared radiation and the frequency of said pump radiation being equal to a frequency of radiation in the visible region of the spectrum; and
   d. means to repetitively reflect said beam of pump radiation back and forth through said nonlinear crystal means to interact with said infrared beam to produce radiation at said visible sum frequency as an output from said crystal means.

8. Apparatus as in claim 7 wherein said beam of pump radiation is supplied through an aperture in said infrared collector, said beam lying in a plane with but at an angle to said axis of symmetry of said collector, said nonlinear crystal means being positioned orthogonally to said axis of symmetry of said collector.

9. Apparatus as in claim 8 wherein said reflector means to multiply reflect said pump beam comprises first and second dichroic mirrors positioned with their axes of symmetry substantially aligned with the axis of symmetry of said collector and on opposite sides of said non-linear crystal means.

10. Apparatus as in claim 9 wherein both said first and second dichroic mirrors have high reflectivity at said pump frequency, said first mirror having high transmissivity at said infrared frequency and said second mirror having high transmissivity at said visible frequency; said first mirror being positioned between said nonlinear crystal means and said infrared collector.

11. Apparatus in claim 8 wherein said nonlinear crystal means comprises a matrix array having a plurality of rows and columns of individual nonlinear crystals and further including at least one prismatic reflector associated with said first mirror and at least another prismatic reflector associated with said second mirror, said one prismatic reflector being positioned to receive said multiply reflected beam after its traverse through one column of said matrix of linear crystals and to displace it in a row direction to the next column of linear crystals for reflection down said column, said other prismatic reflector being positioned to receive said pump beam after having been multiply reflected down said second column of said matrix of nonlinear crystals and to displace it for multiple reflection through the next column thereof.

12. Apparatus as in claim 9 wherein said pump beam is supplied from a continuous wave laser and is transmitted through an aperture in said collector means positioned off of the axis of symmetry thereof.

13. Apparatus as in claim 9 wherein said pump beam is supplied from a Q-switched pump laser and is transmitted through an aperture in said collector means positioned off of the axis of symmetry thereof, said Q-switched laser being triggered by a signal from a trigger delay circuit which in turn receives its input from a Q-switched illuminator laser the output of which illuminates the scene to be observed by repetitive pulses, the trigger delay circuit being adjusted in its time delay to synchronize the arrival of the output pulse from said Q-switched pump laser at said non-linear crystal with the arrival of scene reflected pulses from said illuminator laser.

* * * * *